March 6, 1956 — A. ANDRI — 2,737,142
FENDERS OF THE FLUID ESCAPING TYPE
Filed April 28, 1952
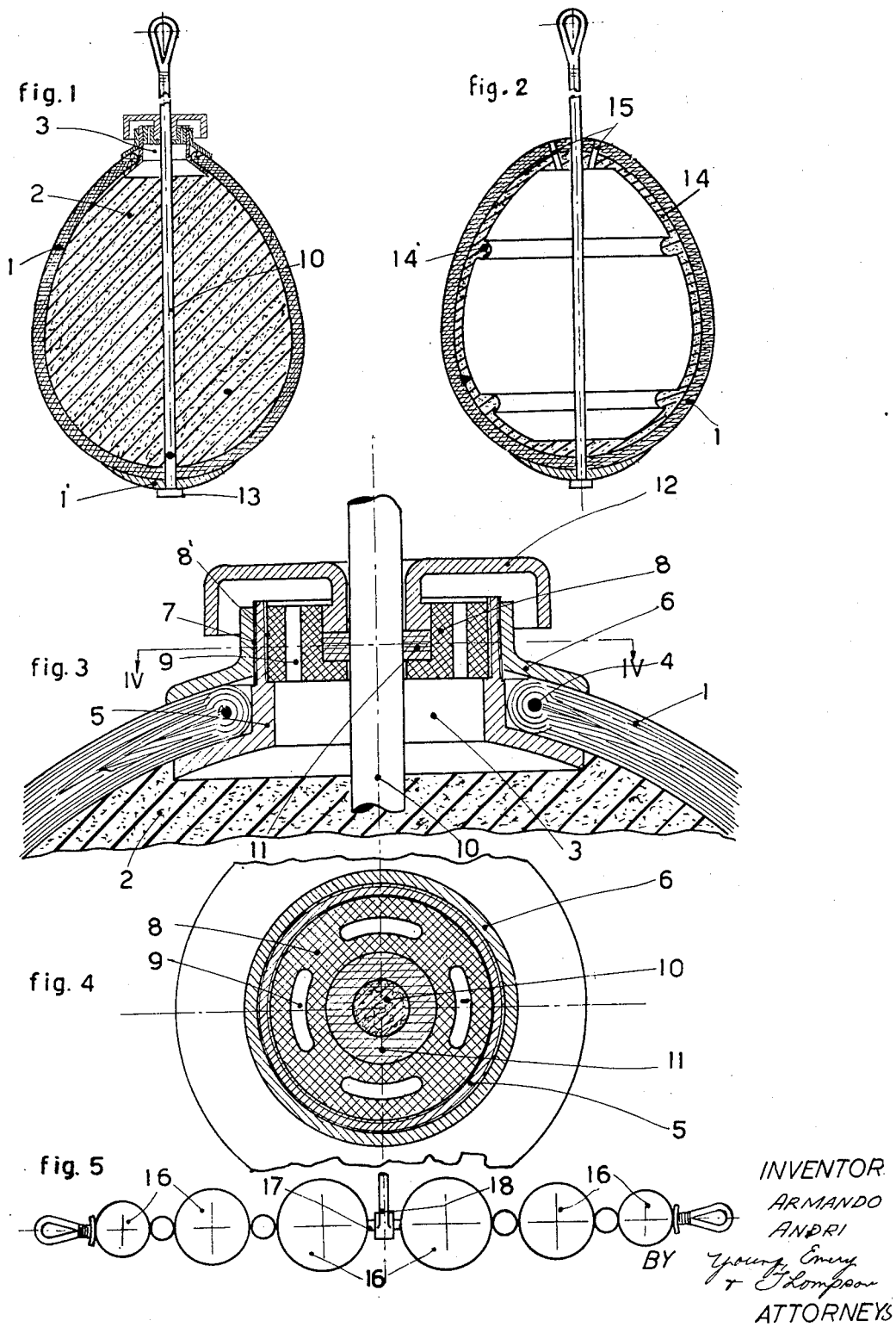
INVENTOR
ARMANDO ANDRI
BY Young, Emery & Thompson
ATTORNEYS United States Patent Office 2,737,142
Patented Mar. 6, 1956

2,737,142

FENDERS OF THE FLUID ESCAPING TYPE

Armando Andri, Genova Sturla, Italy, assignor to Pirelli Societa per Azioni, Milan, Italy, a limited liability company of Italy Application April 28, 1952, Serial No. 284,774

Claims priority, application Italy April 30, 1951

3 Claims. (Cl. 114—219)

It is known to make fenders of the fluid escaping type from a sponge rubber core having interconnected coils enclosed within a continuous covering of flexible material supported in its turn by a holding network, for example a rope netting, said continuous covering being provided with at least a passage port capable, if desired, of adjustment through which a fluid, as for example the atmospheric air, can be alternatively exhausted and sucked again due to the deformations to which the fender is subjected.

In said fenders, the inner sponge mass causes the flexible covering to recover its original shape after the flattening, whilst the outer rope netting sustains the flexible covering.

This kind of fender has various drawbacks. In fact, it appears clear that, as regards the outer rope netting, besides it being subjected to a strong wear and tear action during the shocks and rubbings, it often gets drenched with salt-water more or less mixed with fuel oil which is always present in the water of the harbors, and retains it, whereby the weight of the fender becomes unnecessarily increased and the fender takes on an unsightly appearance, and, moreover, what is more serious, the fuel oil with which the rope netting is soaked is caused to exert a continuous and pernicious action on the flexible covering, generally of rubber and fabrics, shortening thus the life thereof, the more so as the knots of the rope netting tend to penetrate into the depth of the covering while the fender is being flattened, exerting thus high local stresses, which shorten the life of the fender.

Moreover, said kind of rope netting easily allows for relative movements of the flexible covering with respect to the rope netting to take place, so that the port for the air passage, projecting from the surface of said covering, can run the risk of coming into a position different than the desired one and such as to cause it to become flattened and be torn off or anyhow get damaged. Even independently from this fact, the high stresses occurring while the fender is being flattened, often lead to the results of driving out or anyhow tearing away from the covering the air passage device, in default of an absolutely fixed connection between said device and the flexible covering.

As specifically regards the structure of said device, it has the drawbacks in the known fenders of letting the salt-water which clashes against the fenders in the form of sprays, penetrate into the sponge rubber cells, said salt-water, when mixed with certain substances such as fuel oil, being harmful for the preservation of the sponge rubber.

The most serious ones of the above mentioned drawbacks are eliminated in the fender according to the present invention by providing as a holding member a cable extending in the suspension direction through the air passage device into the inner portion of the fender, means being provided for connecting the free ends of said cable to the flexible covering of the fender. Preferably, and according to a feature of the invention, said means consist in an end enlargement of the cable, after it has passed diametrically through the fender, for supporting the flexible covering by the outside in a diametrically opposed point to the entrance point of the cable, so as to prevent the involuntary disengagement of the cable from the fender.

The other drawbacks, and more particularly the one caused by the action of the dirty water on the sponge rubber are eliminated according to the invention in conformity to the following embodiments thereof. According to a first embodiment, the air passage device, in the center of which passes the holding cable, has the shape of a multi-port nozzle with means protecting said nozzle from the sprays apt to be present when in use. Said air passage device is provided with a strong anchorage to the flexible covering of the fender. According to a further embodiment said device, through the centre of which passes the cable, maintains its usual structure and the core of sponge rubber is substituted, for bringing the flexible covering to its original shape, by a hollow yielding rubber body provided, if desired, with ribs, or by a plurality of spherically shaped hollow bodies, on which the dirty salt-water has no action.

The invention is illustrated by way of example in the accompanying drawing, in which:

Fig. 1 is a diametral section of a first embodiment of the invention;

Fig. 2 is a similar section of a further embodiment of the invention;

Fig. 3 is a diametral section on enlarged scale of the top portion of the embodiment of Fig. 1;

Fig. 4 is a section on line IV—IV of Fig. 3, and

Fig. 5 is an outer view of a third embodiment having a plurality of elements.

According to the embodiment of Figs. 1, 3 and 4, the fender consists of a flexible covering 1, made by superposed layers of woven fabric and rubber mutually connected by staggered seams, the cavity of which is completely filled up by a core 2 of sponge rubber.

The flexible covering 1, the vertical section of which is paraboloid shaped, has at one of its poles a large circular opening 3 reinforced on its edge by a steel wire 4. The edge of said opening is enclosed between two elements 5 and 6 provided with screw threads 7 for mutual connection and of which the element 5 forms a nozzle within which is located a disc 8 provided with ports 9 for the passage of the air and of a central opening through which passes the holding cable 10. The tight closure at the cable passage opening is secured by a stuffing-box 11 located in a housing of the disc 8 wherein partially penetrates the hub of a cap 12 which has the duty of protecting ports 9 from water spray. The disc 8 may be fixed by screwing to the element 5 due to the threads 8' with which both are provided.

The holding cable 10 diametrically crosses the core 2 of sponge rubber and goes out from the flexible covering 1 at the side opposite to the entrance nozzle, in correspondence to which it is provided with an enlargement 13 capable of supporting from the outside the covering 1 which is suitably provided in that point with a reinforcement 1'. The reinforcement is united by vulcanization to the covering 1 and can be made of harder rubber or by superimposed layers of fabric and rubber as the covering.

The embodiment shown in Fig. 2 is the same as that of Fig. 1 as regards the holding system and differs therefrom only in that the inner side of the rubbing-strakes instead of being formed by a core of sponge rubber consists in a rubber hollow body 14 with thick walls provided with inner rubber ribs 14' which give it the necessary elastic strength for letting the covering 1 return to its original shape after the deformations caused by the shocks. In this case, since this hollow body does not get damaged by the action of the dirty water, it is not necessary to use the special nozzle of the embodiment of Fig. 1 and the air passages 15 can be machined directly in the hollow body 14 and in the covering 1.

The embodiment of Fig. 5 illustrates a fender consisting in an assembly of spherical elements 16 of the above described kind, supported by a single anchoring cable 17, suspended centrally in 18 so as to permit their location in fixed position over the prow or the stern of the ships for protecting them in said zones from shocks.

By means of the embodiments as above described all the drawbacks of the fenders in use at present, mentioned at the beginning of this specification, are obviated.

What I claim is:

1. A marine fender comprising a strong and comparatively thin flexible covering, a deformable yielding core inside of said covering, offering little resistance to squeezing while being resilient enough to bring said covering to its original shape after it has been flattened and the inside of which indirectly communicates with the external atmosphere, a device connected to said covering for the restricted passage of air outwards from the inside thereof, and a suspension cable penetrating through said device and sealed thereto and extending in the suspension direction and anchored to said covering at the point opposite to said air passage device.

2. A fender as in claim 1 in which said air passage device comprises two concentric annular elements screw interconnected for pressing the edges of an opening of said covering, a disc associated with the inner annular element and provided with holes acting as a nozzle for the passage of air and with a central hole for the passage of the cable, a cap associated with said disc for protecting said holes from water spray, and a sealing gasket between the disc and cap.

3. A fender as in claim 1 in which said yielding core consists in a hollow rubber body having thick walls internally provided with ribs.

References Cited in the file of this patent

UNITED STATES PATENTS

| | | |
|---|---|---|
| Re. 18,672 | Lyons | Nov. 29, 1932 |
| 987,354 | Gawenda | Mar. 21, 1911 |
| 1,877,793 | Beynon | Sept. 20, 1932 |
| 2,062,919 | Maas | Dec. 1, 1936 |
| 2,088,861 | Klum | Aug. 3, 1937 |
| 2,179,125 | Kirlin | Nov. 7, 1939 |
| 2,494,445 | Moeller | Jan. 10, 1950 |

FOREIGN PATENTS

| | | |
|---|---|---|
| 226,101 | Great Britain | Dec. 18, 1924 |
| 373,710 | Germany | Apr. 14, 1923 |
| 432,104 | Great Britain | July 22, 1935 |
| 478,154 | Great Britain | Jan. 13, 1938 |
| 536,883 | Great Britain | May 30, 1941 |
| 633,928 | France | Oct. 31, 1927 |